United States Patent [19]

Gellert

[11] Patent Number: 5,015,170

[45] Date of Patent: May 14, 1991

[54] INJECTION MOLDING COOLED SOCKET HOLDER FOR A HEATED NOZZLE

[76] Inventor: Jobst U. Gellert, 7A Prince Street, Georgetown, Ontario, Canada, L7G 2X1

[21] Appl. No.: 576,841

[22] Filed: Sep. 4, 1990

[30] Foreign Application Priority Data

Jul. 27, 1990 [CA] Canada .................. 2022120

[51] Int. Cl.$^5$ .............................................. B29C 45/74
[52] U.S. Cl. ................................ 425/549; 264/328.15
[58] Field of Search ............................ 425/547, 549; 264/328.15

[56] References Cited

U.S. PATENT DOCUMENTS

| | | | |
|---|---|---|---|
| 4,238,671 | 12/1980 | Gellert | 219/421 |
| 4,622,001 | 11/1986 | Bright et al. | 425/549 |
| 4,687,613 | 8/1987 | Tsutsumi | 425/549 |
| 4,911,636 | 3/1990 | Gellert | 425/549 |

Primary Examiner—Timothy Heitbrink
Attorney, Agent, or Firm—Dalesman & Company

[57] ABSTRACT

An injection molding integral cooled socket holder to be seated in a well in a cavity plate to receive an elongated heated nozzle. A central tube portion extends between a rear collar portion and a forward socket portion to form an elongated socket to receive the nozzle. The tube portion has small diameter inlet and outlet tubes received in longitudinal grooves which carry a flow of cooling water which is received at the rear collar portion to the forward socket portion. The water flows around a circular conduit in the forward socket portion to provide cooling adjacent the gate. The components of the socket holder are integrally brazed together in a vacuum furnace. Socket holders are made with various preselected lengths to match different length nozzles by cutting the central tube portion including the inlet and outlet tubes to different standard lengths.

8 Claims, 3 Drawing Sheets

INJECTION MOLDING COOLED SOCKET HOLDER FOR A HEATED NOZZLE

BACKGROUND OF THE INVENTION

This invention relates generally to injection molding and more particularly to a cooled socket holder which seats in a cavity plate and receives an elongated heated nozzle.

It is well known to seat an injection molding nozzle having an integral electrical heating element in a cooled cavity plate. An example is shown in the applicant's U.S. Pat. No. 4,238,671 which issued Dec. 9, 1980 and shows cooling conduits extending through the cavity plate. U.S. Pat. No. 4,687,613 to Tsutsumi which issued August 18, 1987 shows cooling fluid passages extending through the nozzle itself. U.S. Pat. No. 4,622,001 to Bright et al. which issued Nov. 11, 1986, the applicant's U.S. Pat. No. 4,911,636 which issued Mar. 27, 1990 and Canadian patent application serial number 585,023 to Mold-Masters Limited filed Dec. 5, 1988 all show a cooling passage extending through a mold insert extending around the forward nose portion of a nozzle. With the development of smaller sized injection molding components and the increased demand for more temperature critical materials, the location and size of heating and cooling in injection molding systems have become even more critical to successful operation. This is particularly true for systems using temperature assisted or thermal gating. It is also desirable to provide a cooling arrangement which is economical to make with provision for nozzles of different lengths. While these previous arrangements are satisfactory for some applications, each of them is different to a considerable extent in one or more of the above areas.

SUMMARY OF THE INVENTION

Accordingly, it is an object of the present invention to at least partially overcome the disadvantages of the prior art by providing a cooled socket holder of a preselected length to receive the heated injection molding nozzle.

To this end, in one of its aspects, the invention proves an injection molding integral cooled socket holder to be seated in a well in a cavity plate, the socket holder having a forward end, a rear end, and a central socket extending therethrough to receive an elongated heated nozzle to convey melt to a cavity, the socket holder comprising a hollow rear collar portion having a central opening therethrough, a cooling fluid inlet passage and a cooling fluid outlet passage, the inlet passage having an inlet and an outlet, the outlet passage having an inlet and an outlet, a forward socket portion having an opening therethrough to receive a forward nose portion of the heated nozzle and to provide a gate leading to the cavity, the forward socket portion having a circular cooling fluid conduit with an inlet and an outlet to convey cooling fluid around the forward nose portion of the nozzle adjacent the gate, and a hollow central tube portion of a preselected length with a central cylindrical opening therethrough extending between the rear collar portion and the forward socket portion, the tube portion having a cooling fluid inlet duct and a cooling fluid outlet duct, the inlet duct connecting the outlet from the inlet passage in the rear collar portion to the inlet to the fluid conduit in the forward socket portion, and the outlet duct connecting the outlet from the fluid conduit in the forward socket portion to the inlet to the outlet passage in the rear collar portion.

Further objects and advantages of the invention will appear from the following description, taken together with the accompanying drawings.

DETAILED DESCRIPTION OF THE DRAWINGS

Figure 1:
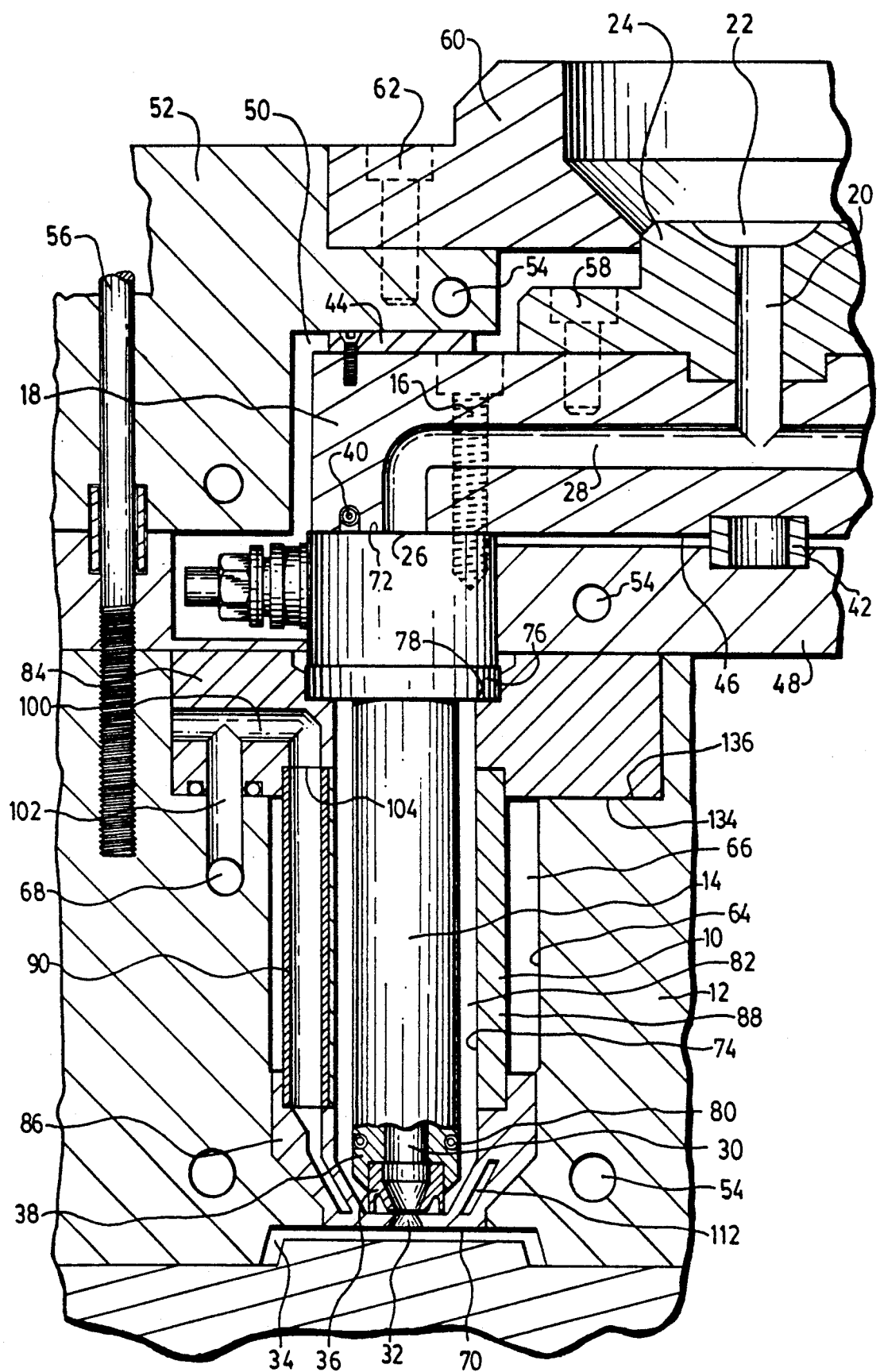
FIG. 1 is a sectional view of a portion of an injection molding system showing a heated nozzle seated in a socket holder according to one embodiment of the invention.

Reference is first made to FIG. 1 which shows a portion of a multi-cavity injection molding system in which a cooled socket holder 10 according to one embodiment of the invention is seated in a cavity plate 12 and receives a heated elongated nozzle 14. The nozzle 14 is secured by bolts 16 to a common elongated manifold 18. A melt passage 20 extends through the manifold 18 from a recessed inlet 22 in a manifold extension 24 and branches to a number of outlets 26. Each branch 28 of the melt passage 20 extends through a central bore 30 of the heated nozzle 14 to a gate 32 leading to a cavity 34. In the system shown, each branch 28 of the melt passage 20 also extends through a seal insert 36 which is seated in the nose portion 38 of the nozzle 14 and extends around the gate 32.

The elongated manifold 18 is heated by a heating element 40 which is integrally brazed into it. The manifold 18 is held in place by a central locating ring 42 and insulating pressure pads 44. The locating ring 42 bridges an insulative air space 46 between the heated manifold 18 and a cooled spacer plate 48. The pressure pads 44 provide another insulative air space 50 between the heated manifold 18 and a cooled clamp plate 52. The spacer plate 48, the clamp plate 52 and the cavity plate 12 are cooled by pumping cooling water through cooling conduits 54. The clamp plate 52 and spacer plate 48 are secured in place by bolts 56 which extend into the cavity plate 12. The manifold extension 24 is held in place by screws 58 and a locating collar 60 which is secured to the clamp plate 52 by screws 62.

The socket holder 10 is seated in a well 64 in the cavity plate 12 with a partial insulative air space 66 extending around between them. A pair of cooling fluid conduits 68 (only one of which is shown) extend through the cavity plate 12 to the socket holder 10 as described in more detail below. In this embodiment, the forward end 70 of the socket holder 10 extends to the cavity 34, and it is held securely in position by the force of the spacer plate 48 which abuts against the rear end 72. The socket holder 10 has a central socket 74 which receives the heated nozzle 14 with an insulation flange 76 seated in a circumferential seat 78. The nozzle 14 which is heated by an integral electrically insulated spiral heating element 80 is separated from the surrounding cooled socket holder 10 by another insulative air space 82. The seal insert 36 which is mounted between the nose portion 38 of the nozzle 14 and the socket holder 10 prevents pressurized melt from escaping from the melt passage 20 into the air space 82.

Figure 2:
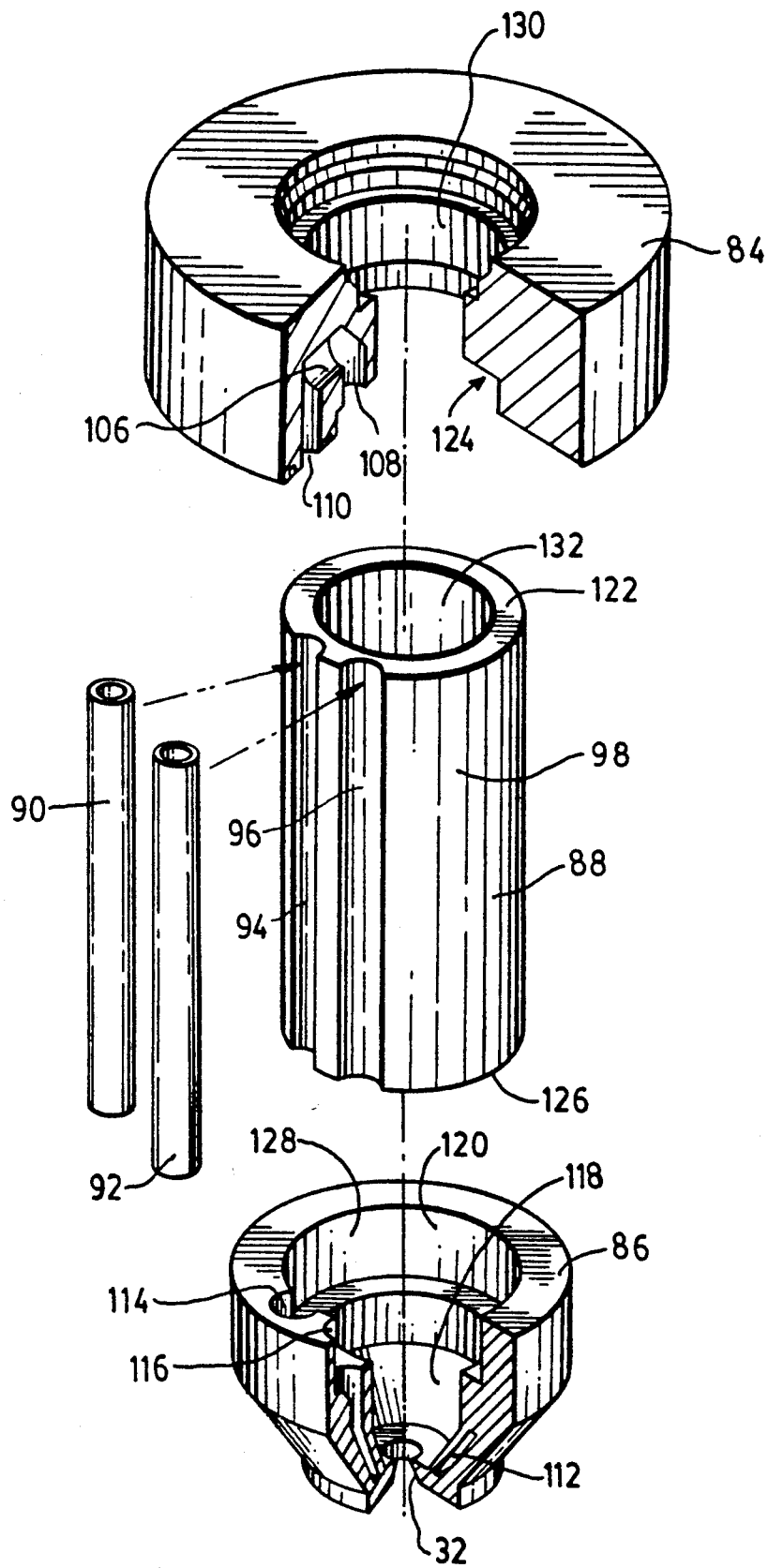
FIG. 2 is an exploded isometric view of the same socket holder.

Reference is now made to FIG. 2 to describe in detail the structure of the socket holder 10 according to this embodiment of the invention. The components, which are shown in position for assembly, are a rear collar portion 84, a forward socket portion 86 and a central tube portion 88 having small diameter inlet and outlet tubes 90,92. The inlet and outlet tubes 90,92 are received in matching longitudinal grooves 94,96 in the cylindrical outer surface 98 of the central tube portion 88. The rear collar portion 84 has a cooling fluid inlet passage 100 with an inlet 102 and an outlet 104 (FIG. 1), and a cooling fluid outlet passage 106 with an inlet 108 and an outlet 110 (FIG. 2). The forward socket portion 86 has a circular cooling fluid conduit 112 with a partition (not shown) between an adjacent inlet 114 and outlet 116. The forward socket portion 86 has a central opening 118 which extends therethrough from a rear mouth 120 to a forward small diameter central outlet which forms the gate 32.

The central tube portion 88 is mounted between the rear collar portion 84 and the forward socket portion 86. The rear end 122 of the central tube portion 88 extends into a matching seat 124 in the rear collar portion 84, and the forward end 126 extends into a similar seat 128 in the forward socket portion 86. The inlet and outlet tubes 90,92 are similarly received between the cooling fluid outlet 104 and inlet 108 in the rear collar portion 84 and the inlet and outlet 114 and 116 in the forward socket portion 88. After the components are assembled, a nickel brazing paste is applied along where they join, and they are integrally brazed together in a vacuum furnace. This fuses the inlet and outlet tubes 90,92 in the grooves 94,96 so they are an integral part of the central tube portion 88, and also prevents any leakage where they join the rear collar portion 84 and the forward socket portion 86. The rear collar portion 84 has a central opening 130 extending therethrough and the central tube portion 88 has a central cylindrical opening 132 extending therethrough, both of which are aligned with the rear mouth 120 of the opening 118 in the forward socket portion 86 to form the central socket 74 which receives the heated nozzle 14.

In this embodiment, the rear collar portion 84 also forms an outwardly extending shoulder 134 which abuts against a matching rearwardly facing shoulder 136 which extends circumferentially around the well 64 in the cavity plate 12 to accurately locate the socket holder 10 in the well 64. As seen in FIG. 1, the cooling water conduits 68 extend rearwardly to join the inlet 102 and outlet 110 to the cooling fluid inlet and outlet passages 100,106 in the flange 134.

As is known, nozzles 14 having different lengths are required for different applications. The structure of the socket holder 10 according to the invention facilitates the provision of socket holders having matching standard lengths. This is achieved by merely cutting the central tube portion 88, including the inlet and outlet tubes 90,92, to different standard standard lengths prior to assembly. In addition to facilitating manufacture, this has the advantage, that it substantially reduces component inventory costs.

In use, after the system has been assembled as shown in FIG. 1, electrical power is applied to the heating elements 40, 80 to heat the manifold 18 and the nozzle 14 to a predetermined operating temperature. At the same time, a cooling fluid such as water is pumped into the cooling fluid inlet passage 100 in the rear collar portion 84 from the one of the conduits 68 in the cavity plate. The water flows through the inlet tube 90 in the central tube portion 88, around the circular cooling fluid conduit 112 in the forward socket portion 86, and back out the outlet tube 92 and the outlet passage 106 to provide cooling adjacent the gate 32. Hot pressurized melt is then introduced into the melt passage 20 through the recessed inlet 22 from a molding machine (not shown) according to a predetermined cycle. The melt branches in the manifold 18 and flows through the melt bore 30 of each nozzle 14 to the gate 32 and fills the cavity 34. After the cavities 34 are full, injection pressure is held momentarily to pack and then released. After a short cooling period, the mold is opened to eject the molding. Injection pressure is reapplied after the mold is closed following ejection. This precise cycle is repeated continuously with a frequency dependent on the size and shape of the cavity and the type of material being molded.

Figure 3:
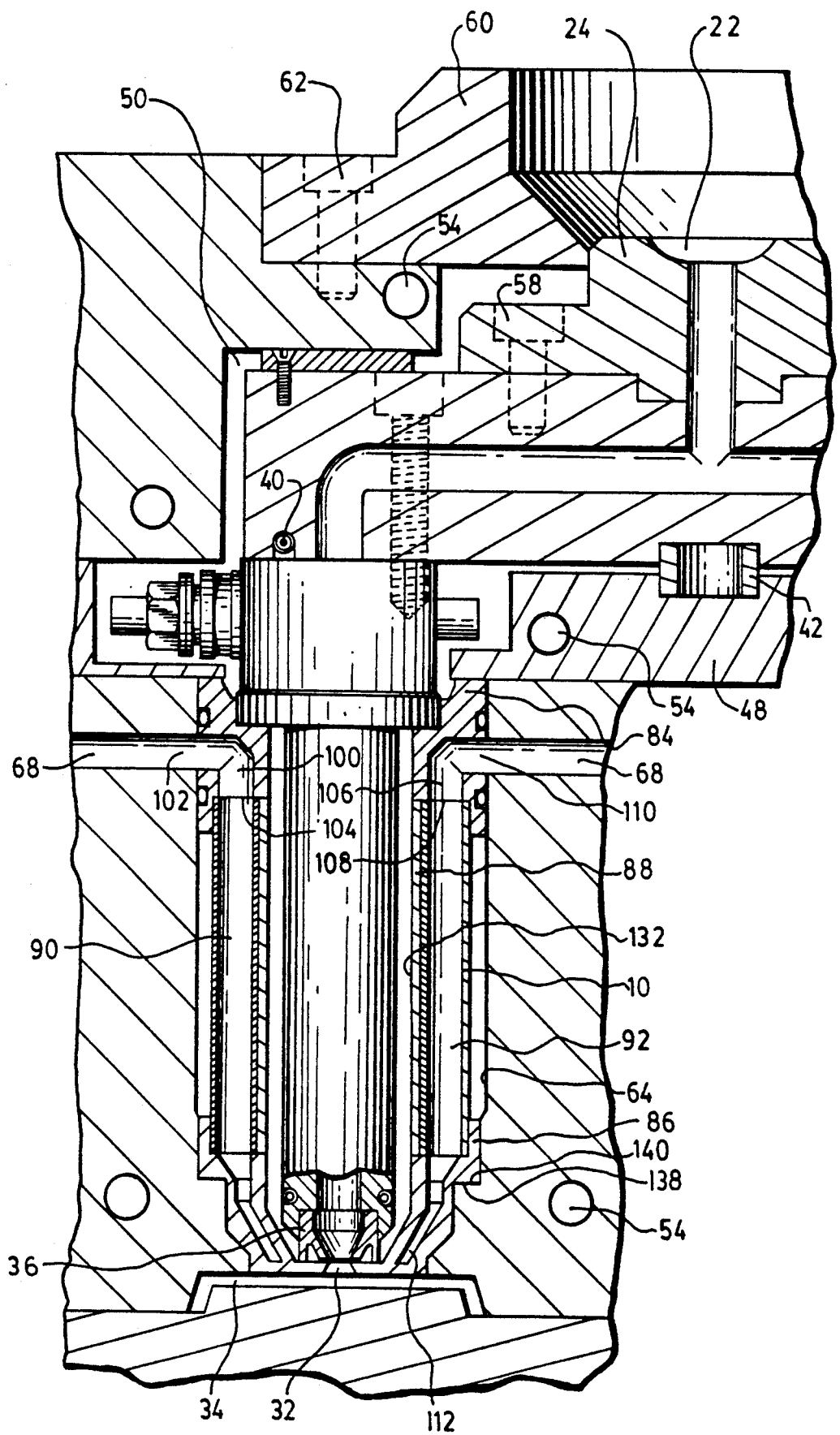
FIG. 3 is a sectional view similar to FIG. 1 showing a socket holder according to another embodiment of the invention.

Reference is now made to FIG. 3 which shows a portion of an injection molding system having a socket holder 10 according to another embodiment of the invention. As most of the elements of this system are the same as those described above, elements common to both embodiment are described and illustrated using the same reference numerals. In this embodiment, the rear collar portion 84 of the socket holder 10 is smaller in diameter so it does not form a bearing shoulder. However, the forward socket portion 86 does form an outwardly projecting shoulder 138 which bears against a rearwardly facing shoulder 140 which extends around the well 64 in the cavity plate 12. The inlet and outlet tubes 90,92 are located on opposite sides of the cylindrical opening 132 through the central tube portion 88, rather than adjacent each other. Thus, no partition is required in the circular conduit 112 in the forward socket portion 86 as part of the cooling water flows around each way. Furthermore, the inlet 102 to the inlet passage 100 and the outlet 110 from the outlet passage 106 extend radially outward rather than forward from the rear collar portion 84 to connect to the conduits 68 in the cavity plate 12. The operation of this embodiment of the invention is essentially the same as that described above, and the description need not be repeated.

While the description of the socket holder according to the invention has been given with respect to preferred embodiments, it is not to be construed in a limiting sense. Variation and modifications will occur to those skilled in the art. For instance, the socket holder 10 and the nozzle 14 can have different configurations to provide different types of gating. A greater number of small diameter inlet and outlet tubes 90,92 can be used to provide a greater volume of flow of cooling fluid. Reference is made to the appended claims for a definition of the invention.

What I claim is:

1. An injection molding integral cooled socket holder to be seated in a well in a cavity plate, the socket holder having a forward end, a rear end, and a central socket extending therethrough to receive an elongated heated nozzle to convey melt to a cavity, the socket holder comprising:
   (a) a hollow rear collar portion having a central opening therethrough, a cooling fluid inlet passage and a cooling fluid outlet passage, the inlet passage having an inlet and an outlet, the outlet passage having an inlet and an outlet,
   (b) a forward socket portion having an opening therethrough to receive a forward nose portion of the heated nozzle and to provide a gate leading to the cavity, the forward socket portion having a circular cooling fluid conduit with an inlet and an outlet to convey cooling fluid around the forward nose portion of the nozzle adjacent the gate, and (c) a hollow central tube portion of a preselected length with a central cylindrical opening therethrough extending between the rear collar portion and the forward socket portion, the tube portion having a cylindrical outer surface, the outer surface having first and second outwardly open longitudinal grooves therein, a first small diameter tube of a preselected length being received in the first groove to provide a cooling fluid inlet duct and a second small diameter tube of a preselected length being received in the second groove to provide a cooling fluid outlet duct, the inlet duct connecting the outlet from the inlet passage in the rear collar portion to the inlet to the fluid conduit in the forward socket portion, and the outlet duct connecting the outlet from the fluid conduit in the forward socket portion to the inlet to the outlet passage in the rear collar.

2. An injection molding socket holder as claimed in claim 1 wherein the central tube portion has a forward end and a rear end, the forward end being seated in the forward socket portion, and the rear end being seated in the rear collar portion.

3. An injection molding socket holder as claimed in claim 2 wherein the opening through the forward socket portion has a central rear mouth which is equal in diameter to and aligned with the central cylindrical opening through the tube portion and the central opening through the rear collar portion to form the central socket.

4. An injection molding socket holder as claimed in claim 3 wherein the first and second small diameter tubes are the same length.

5. An injection molding socket holder as claimed in claim 4 wherein the opening through the forward socket portion has a forward small diameter central outlet which forms the gate to the cavity.

6. An injection molding socket holder claimed in claim 5 wherein the first and second small diameter tubes are mounted on opposite sides of the cylindrical opening through the central tube portion.

7. An injection molding socket holder as claimed in claim 5 wherein the first and second small diameter tubes extend adjacent each other along the central tube portion, and the forward socket portion has a partition between the adjacent inlet an outlet to the circular cooling fluid conduit.

8. An injection molding socket holder as claimed in claim 3 wherein the socket holder has an outwardly extending circumferential shoulder to abut against a matching rearwardly facing shoulder extending circumferentially around the well in the cavity plate to locate the socket holder in the well.

* * * * *